United States Patent [19]

Graiver et al.

[11] Patent Number: 5,225,120
[45] Date of Patent: Jul. 6, 1993

[54] METHOD FOR PREPARING TUBING AND HOLLOW FIBERS FROM NON-CROSSLINKED POLYVINYL ALCOHOL HYDROGELS

[75] Inventors: Daniel Graiver, Midland; Arnold W. Lomas, Rhodes, both of Mich.

[73] Assignee: Dow Corning Corporation, Midland, Mich.

[21] Appl. No.: 851,599

[22] Filed: Mar. 16, 1992

Related U.S. Application Data

[62] Division of Ser. No. 759,343, Sep. 13, 1991.

[51] Int. Cl.$^5$ .................. B29C 35/16; D01D 5/24; D01F 6/14
[52] U.S. Cl. .................. 264/28; 264/185; 264/203; 264/209.5; 264/210.8; 264/211.17
[58] Field of Search .............. 264/28, 185, 203, 209.1, 264/209.3, 209.5, 210.8, 211.17

[56] References Cited

U.S. PATENT DOCUMENTS

| 4,385,094 | 5/1983 | Tanaka et al. | 264/185 X |
| 4,851,168 | 7/1989 | Graiver et al. | 264/28 |

FOREIGN PATENT DOCUMENTS 1-221511  9/1989  Japan .................. 264/185

*Primary Examiner*—Leo B. Tentoni
*Attorney, Agent, or Firm*—Robert Spector

[57] ABSTRACT

This invention relates to hollow elongate articles such as tubing and fibers formed from non-crosslinked polyvinyl alcohol. The articles are prepared by extruding a solution of polyvinyl alcohol in the shape of the desired article into a coagulating bath concurrently with a stream of a non-solvent for the polymer. The stream occupies the area corresponding to the interior cavity of the article and prevents collapse of the cavity until the article has solidified in the coagulation bath.

4 Claims, No Drawings

METHOD FOR PREPARING TUBING AND HOLLOW FIBERS FROM NON-CROSSLINKED POLYVINYL ALCOHOL HYDROGELS

This is a divisional of copending application Ser. No. 07/759,343 filed on Sep. 13, 1991.

BACKGROUND OF THE INVENTION

1. Field of the Invention

This invention relates to articles consisting essentially of non-crosslinked polyvinyl alcohol. More particularly, this invention relates to elongate hollow articles in the form of tubing and fibers. This invention also relates to a method for preparing these articles from solutions of polyvinyl alcohol without chemically crosslinking the polymer. The prior art teaches the need for this type of crosslinking to prevent collapse of the article during or shortly after extrusion.

Background Information

Gels, fibers and other products prepared from solutions of polyvinyl alcohol in water or a mixture of water and a water-miscible organic solvent such as methanol, propanol, dimethyl sulfoxide and N,N-dimethylformamide are well known from numerous patents and other publications.

Typical of recently issued patents describing gels formed from aqueous solutions of polyvinyl alcohol is U.S. Pat. No. 4,663,358, which issued to Hyon et al on May 5, 1987. This patent teaches cooling to below room temperature a solution of polyvinyl alcohol in a mixture of water and a water-miscible organic solvent such as alcohols containing from 1 to 4 carbon atoms, glycols and dimethyl sulfoxide. Mixtures of water and dimethyl sulfoxide are preferred, and the water can constitute from 10 to 90 weight percent of the solvent mixture. The gel formed by cooling the solution is then immersed in flowing water to remove the organic solvent. Alternatively the initial gel is dried to remove substantially all of the solvent and then immersed in water to form the hydrogel.

Hydrogels prepared as described in the Hyon patent are transparent whereas gels formed using a solution of polyvinyl alcohol in either water or dimethyl sulfoxide as the only solvent are opaque.

Fibers formed from polyvinyl alcohol and various methods for preparing such fibers are discussed in a text by Ichiro Sakurada entitled "Polyvinyl Alcohol Fibers" (Marcel Decker, 1985). Most of the methods for preparing polyvinyl alcohol fibers that are described in this text use a solution of the polymer in either water or a mixture of water and a water-miscible organic solvent. The one notable exception was originally reported by H. M. Zwick and involves using a solvent or solvent mixture that causes phase separation into a solvent and a polymer-rich phase at a point between the spinneret and the takeup reel. The resultant fibers were washed to remove the solvent and then hot drawn using a draw ratio of between 2.6:1 and 8:1. Single solvents suggested for use in this method include benzenesulfonamide, caprolactam, and trimethylolpropane. Solvent mixtures include dimethyl sulfoxide/pentaerythritol and water in combination with urea or thiourea.

Various solvents for use in spinning polyvinyl alcohol fibers are taught in U.S. Pat. Nos. 4,698,194 and 4,603,083, which issued to Tanaka et al. on Oct. 6, 1987; U.S. Pat. Nos. 4,713,290 and 4,599,267, which issued to Kwon et al. on Dec. 15, 1987; and U.S. Pat. No. 4,765,937, hereinafter the '937 patent, which issued to Hyon et al. on Aug. 23, 1988.

The patents issued to Kwon teach preparing fibers from polyvinyl alcohol by extruding a heated polymer solution through at least one orifice and cooling it sufficiently rapidly to form a gel fiber, extracting the solvent used to initially dissolve the polymer with a volatile second solvent, and subsequently drying the fiber to form a "xerogel". The fiber is drawn in one or two stages at any point during or following cooling of the initially extruded fiber.

The fibers described in the aforementioned '937 patent exhibit tenacity values greater than 15 grams per denier. The degree of polymerization of the polymer used to prepare the fibers is preferably greater than 1700, and the polymer is dissolved in a mixture of water and a water-miscible organic solvent. Suitable organic solvents are disclosed in the aforementioned U.S. Pat. No. 4,663,358 to Hyon et al. directed to polyvinyl alcohol gels. Any of the conventional wet- or dry spinning methods can be used to form the fiber.

According to the teaching in the '937 patent, the temperature of the bath used to coagulate the spun fibers is preferably below −20 degrees C. After being dried the fibers are drawn at a temperature of from 140 to 220 degrees C. in air, an inert gas, silicone oil or polyethylene glycol using a draw ratio of from 20 to 200.

The use of boric acid or borate salts as crosslinking agents for polyvinyl alcohol fibers is taught in U.S. Pat. No. 4,612,157. The purpose of crosslinking is to improve the physical properties of the final fiber. The initial fibers are prepared by extruding a polyvinyl alcohol solution into an alkaline coagulating bath.

Japanese patent publication (Kokai) 02/112,407 describes a method for preparing fibers from polyvinyl alcohol and mixtures of polyvinyl alcohol with other fiber-forming polymers during which the fiber is repeatedly frozen and defrosted.

A method for preparing non-crosslinked solid core fibers from solutions of polyvinyl alcohol in non-aqueous mixtures of dimethyl sulfoxide and an alcohol containing from 1 to 4 carbon atoms is described in U.S. Pat. No. 4,851,168, issued to one of the present inventors, R. Kalinowski and G. Dahlbeck on Jul. 25, 1989.

Prior art methods for preparing hollow fibers and tubing from solution of polyvinyl alcohol always require a step during which the polymer is chemically crosslinked. Crosslinking maintains the integrity of tubing and avoids collapse of the hollow core in smaller diameter hollow fibers before the extruded profile is completely solidified in the coagulating bath.

Japanese patent publication 123,926, published in 1975, teaches forming the internal cavity in hollow fibers by the evolution of a gas such as carbon dioxide as the spinning dope used to form the fiber is extruded into a liquid medium. The gas can be generated by the reaction of a carbonate with an acidic medium used to coagulate the fibers.

A two-step "wet-dry" spinning process for hollow core crosslinked fibers similar to the one used to prepare conventional solid core PVA fibers is described in an article by V. Sakurada et al. that appeared in Polymer Journal, 19 (5) 501–503 (1987). Careful control of spinning conditions is required to achieve a continuous cavity within fibers that are extruded using a capillary spinneret.

In accordance with a method for preparing hollow fibers described in U.S. Pat. No. 4,073,733, which issued to K. Yamaguchi et al. on Feb. 14, 1978, a solution of PVA prepared by dissolving the polymer in a polyethylene glycol at 100° C. is extruded into an aqueous coagulation bath containing sodium hydroxide and sodium sulfate. The relative weak fibers are then immersed in a hot aqueous solution of glutaraldehyde, sulfuric acid and sodium sulfate to convert the polymer to a crosslinked material, following which the polyethylene glycol is extracted from the fibers.

Crosslinking of PVA hollow fibers using formaldehyde is taught by C. Cheng, Y. Chang, M. Chen and A. Tobalski in the Journal of Applied Polymer Science 17, 789 (1973). The resultant fibers exhibited high levels of water permeability, mechanical properties and salt rejection.

Methods for preparing hollow fibers prepared from crosslinked polyvinyl alcohol are also described in the following patents and other publications:
J. Chromotogr. 368(2) 391-4 (1986)
Japanese patent publication 61/42301, published Feb. 28, 1986
Japanese patent publication 58/40102, published Mar. 9, 1983
Japanese patent publication 75/113809, published Jul. 15, 1982
Japanese patent publication 56/10533, published Feb. 5, 1981
Japanese patent publication 56/11931, published Feb. 5, 1981
Japanese patent publication 52/21422, published Feb. 18, 1977

Hollow fibers prepared from a blend of formaldehyde-modified Nylon 66 and polyvinyl alcohol are described in British patent No. 1,577,547, which issued on Oct. 22, 1980.

One disadvantage of articles formed from crosslinked polyvinyl alcohol (PVA) is the inability of these articles to absorb aqueous liquid media and swell to at least twice their original dimensions while developing certain desirable surface properties such as lubricity. These properties together with their biocompatibility make non-crosslinked polyvinyl alcohol hydrogels uniquely suited for certain medical end use applications described in detail elsewhere in this specification.

Hollow fibers have been prepared from uncrosslinked blends of a polyvinyl alcohols and other polymers. U.S. Pat. No. 4,039,499 describes the preparation of such fibers from blends of a polyvinyl alcohol and an N-alkoxyalkyl polyamide. German patent No. 2,615,954, which issued on Nov. 18, 1976 teaches preparing hollow non-crosslinked fibers from blends of PVA and a polyethylene glycol.

The biocompatibility and antithrombic properties of polyvinyl alcohol make it a desirable material for use in fabricating or coating articles such as catheters that are implanted or passed through the bodies of animals, particularly humans. Coating catheters with PVA hydrogels to reduce blood clotting is reported by M. Okada et al. in Japanese Patent Publication No. 01/115,362, which issued during May of 1989. The catheters were formed from polyether/polyurethane copolymers.

One objective of the present invention is to provide a method for preparing tubing and hollow fibers from polyvinyl alcohol. A second objective is to provide small diameter tubing formed from a non-crosslinked polyvinyl alcohol in the absence of other polymers.

SUMMARY OF THE INVENTION

Hollow elongate articles such as tubing and fibers are prepared by extruding a solution of polyvinyl alcohol (PVA) in a liquid mixture comprising dimethyl sulfoxide and from 10 to about 30 percent, based on the weight of said mixture, of a miscible liquid selected from the group consisting of water and alcohols containing from 1 to about 4 carbon atoms. The PVA solution is extruded into a chilled coagulating bath from a die having at least one hollow mandrel positioned in it to provide at least two passages through the die. The PVA solution is extruded through the passage between the outer surface of the mandrel and the perimeter of the die while a non-solvent for PVA is simultaneously extruded through the hollow mandrel to maintain the configuration of the hollow core while the shaped article is gelling during its passage through the coagulating bath.

The resultant hollow elongate articles can be drawn up to seven times their as-extruded length to form tubing and hollow fibers exhibiting excellent mechanical properties while retaining the desirable surface characteristics, ability to swell in water and biocompatibility characteristic of non-crosslinked PVA hydrogels.

DETAILED DESCRIPTION OF THE INVENTION

The present invention provides elongate hollow articles having a hollow core and comprising a non-crosslinked polyvinyl alcohol, where the number average molecular weight of said polyvinyl alcohol is at least 44,000 and said articles are selected from the group consisting of tubing and fibers.

The present invention also provides a method for preparing elongate articles having a substantially circular contour, a hollow central core and comprising a non-crosslinked polyvinyl alcohol, said method comprising the sequential steps of 1) preparing a 2 to 30 weight percent solution of polyvinyl alcohol in a liquid mixture consisting essentially of dimethyl sulfoxide and from 10 to about 30 percent, based on the weight of said mixture, of a liquid that is miscible with dimethyl sulfoxide and is selected from the group consisting of water and alcohols containing from 1 to about 4 carbon atoms, where the number average molecular weight of said polyvinyl alcohol is at least 44,000;

2) extruding the resultant polyvinyl alcohol solution in the form of said article into a coagulation bath concurrently with extrusion of a first non-solvent for polyvinyl alcohol, where said coagulation bath consists essentially of a second non-solvent for said polyvinyl alcohol and is maintained at a temperature no higher than −10° C., said solution and said first non-solvent are extruded through a die having a perimeter and an outer orifice that is in close proximity to said coagulation bath and a hollow mandrel positioned within said die to provide an elongated article having a central core; the outer orifice defining the outer contour of said article and the outer surface of the mandrel defining the hollow central core of said article, the hollow mandrel having a first passage therethrough culminating in an inner orifice which is in communication with the hollow central core of the extruded article, and where said PVA solution is extruded through a second passage defined by the perimeter of the die and the outer surface of the mandrel, concurrently with extrusion of said first non-solvent through said first passage at a rate sufficient to maintain the contour of said central core during coagulation of said article; and 3) removing said article from said coagulation bath and displacing at least the dimethyl sulfoxide portion of the liquid mixture retained in said article with water or a liquid alcohol.

The as-extruded articles can be drawn while in the coagulation bath using a take-up spool with a surface speed that is up to about 30 times the rate at which the polyvinyl alcohol solution is extruded into the coagulating bath. The ratio between the speed of the take-up spool and the extrusion rate of the PVA solution is dependent upon a number of variables, including concentration of the PVA solution, temperature, feed rate of the non-solvent that is extruded together with the PVA solution and the configuration of the die through which this solution is extruded.

When it is desired to form hollow fibers, the elongate articles of this invention are subjected to an additional drawing step prior to which the articles are dried. The additional drawing is carried out in a heated medium using a draw ratio that will achieve an orientation and cystallinity appropriate for the desired end use application of the fiber. .

If water is not present in the extraction bath for removal of the dimethyl sulfoxide present in the initial polyvinyl alcohol solution, the extruded articles can be immersed in water to generate or regenerate a hydrogel, depending upon whether water was present in the initial PVA solution.

The novel feature of this invention resides in extruding a stream of non-solvent for the polyvinyl alcohol to fill the central cavity of the hollow article as the article is being extruded. The presence of the non-solvent within the central cavity of the article prevents collapse of the cavity while the article is solidifying in the coagulation bath. The non-solvent must be immiscible with the solution of PVA that is being extruded into the coagulation bath.

Liquid polydimethylsiloxanes are preferred non-solvents for co-extrusion with the polyvinyl alcohol, based on their low freezing point.

The steps of the present method will now be explained in detail.

The Initial Polyvinyl Alcohol Solution

Polyvinyl alcohol, also referred to in this specification as PVA, is typically prepared by hydrolysis or saponification of polyvinyl carboxylate such as polyvinyl acetate. The degree of hydrolysis varies depending upon the intended end use of the polymer. The vinyl alcohol polymers of this invention are preferably fully hydrolyzed and are linear or contain at most a minimal degree of branching. The reason for this preference is to achieve the maximum degree of hydrogen bonding. The formation of hydrogen bonding between hydroxyl groups on adjacent polymer molecules and crystallization of the polymer are considered responsible for the development of the excellent physical properties associated with the cured polymer.

The molecular weight of the PVA used to prepare the present composition is determined by the end use of the polymer. Regardless of the intended end use, the PVA should have a number average molecular weight of not less than 44,000, preferably not less than 75,000. Commercially available polymers with number average molecular weights of from 75,000 to 440,000 are preferred for preparing hydrogels, particularly those polymers containing relatively large concentrations of syndiotactic or isotactic segments within the polymer molecules. Because the tensile properties of PVA tubing are typically directly proportional to the molecular weight of the polymer, it is preferred to use the highest available molecular weight polymer when the objective is to maximize the physical properties of the final tubing. The delineation between the terms "tubing" and "fibers" used in the present specification is arbitrary, and is based on the diameter of the final article.

In accordance with the first step of the present method, the PVA is dissolved in a liquid mixture consisting essentially of dimethyl sulfoxide, which is a solvent for polyvinyl alcohol, and from 10 to about 30 weight percent, based on the weight of the liquid mixture, of either at least one aliphatic alcohol containing from 1 to about 4 carbon atoms, a non-solvent for the polymer, or water, a solvent for the polymer. The alcohol or water preferably constitutes from 15 to 25 weight percent of the liquid mixture used to dissolve the PVA.

Alcohol concentrations greater than about 40 weight percent typically result in precipitation of the polymer from the solution. The presence of more than 40 weight percent of water in the liquid mixture used to dissolve the PVA has been shown to adversely affect the mechanical properties of the final fiber or tubing.

The concentration of PVA in the solutions that are extruded to form the present articles should be between 2 and 30 weight percent. Below about 2 weight percent gelation of the PVA in the coagulation bath is relatively slow an the internal cavity of the article is not continuous. When the concentration of PVA exceeds about 30 weight percent, the high viscosity of the polymer solution may make it difficult to extrude even heated solutions of the polymer at a useful rate.

The optimum PVA concentration range is determined by a number of variables, including the molecular weight of the polyvinyl alcohol and the ability of the extrusion apparatus to operate under the temperatures and pressures required to extrude more concentrated solutions of high molecular weight polymers. The properties of hydrogels, particularly tensile strength and elongation at breaks, typically increase with increasing concentration and/or molecular weight of the polymer.

The solutions of PVA used to extrude the hollow tubing and fibers of the present invention can be prepared by dissolving the polymer in dimethyl sulfoxide and then adding the desired amount of alcohol or water. Solubilization of the polymer is usually facilitated by heating a mixture of the polymer and dimethyl sulfoxide to temperatures close to or at the boiling point of the solvent mixture and stirring until the polymer is completely dissolved. Heating is preferably done under an atmosphere of nitrogen or other inert gas to minimize degradation of the polyvinyl alcohol. When alcohol is used in combination with dimethyl sulfoxide it is then added gradually to avoid precipitating the polymer.

Preparation of Hollow Articles

Solutions of polyvinyl alcohol prepared in accordance with the present method are converted into tubing and hollow fibers using the wet-dry spinning and drawing techniques conventionally used to prepare solid core fibers. These techniques are described in the prior art, including the aforementioned U.S. Pat. No. 4,765,967 to Hyon et al.

To decrease the viscosity of the PVA solution during the extrusion step is has been found desirable to extrude heated solutions of the polymer. The temperature of the solution should be in the range from 60° to 90° C. using solutions containing 10 weight percent or more of the polymer. Heating is also desirable to avoid gelation of the PVA that can occur over a period of time at temperatures below about 30° C.

The feature that characterizes the present extrusion method is the use of a die or other extrusion shaping device containing a hollow mandrel. The configuration of the passage defined by the perimeter of the die and the surface of the mandrel typically corresponds to the configuration of the solid portion of the shaped article and the hollow portion of the mandrel corresponds to the hollow central core of the article. The inner and outer diameters of the tubing formed using a given die and mandrel are determined by at least two process variables, namely the pressures under which the PVA and non-solvent are extruded and the extent to which the tubing is drawn.

The polyvinyl alcohol solution is extruded through the die while a non-solvent for the PVA is simultaneously extruded through the hollow mandrel under a pressure sufficient to prevent collapse of the central core of the tubing or fiber before the article has completely solidified in the coagulating bath.

In preferred embodiments of the present method the core of the mandrel and perimeter of the die are cylindrical.

The maximum diameter of the die perimeter will be determined at least in part by the ability of the PVA solution to coagulate quickly enough to avoid collapse of the extruded tubing. It should be apparent that this ability is determined by a number of variables, including the viscosity of the polymer solution and the temperature of the as-extruded tubing in the coagulation bath.

The primary requirements for the non-solvent that is extruded together with the PVA solution is that it remains liquid at the temperature of the coagulation bath and not interact with the PVA. Suitable non-solvents for coextrusion with the PVA include alcohols containing from 1 to about 4 carbon atoms and liquid polydiorganosiloxanes. Liquid polydimethylsiloxanes having viscosities between about 0.01 and about 1 Pa.s are particularly preferred for this purpose, based on their availability and low freezing point.

The PVA solution and the stream of non-solvent are extruded simultaneously in the form of the desired shaped article into a coagulating bath maintained at a temperature no higher than about −10 degrees C. and preferably less than −50 degrees C. The coagulating bath contains at least o ne liquid that is non-solvent for the PVA. This liquid is preferably a primary monohydric alcohol containing from 1 to 4 carbon atoms.

As the gelled article emerges from the coagulation bath it is collected using a spool or other suitable take-up device. The pressure under which the PVA solution is extruded and the speed at which the gelled article is pulled through the coagulating bath by the collection reel have been shown to affect both the inside and outside diameters of the tubing or fiber produced. The products referred to in this specification as hollow fibers undergo an additional drawing step to further reduce their outside diameter, and increase the orientation of the PVA molecules. The additional drawing step improves the mechanical properties of the polymer and decreases both the water content of the article and the maximum water content of the hydrogel formed when the article is subsequently exposed to water.

The outer diameter of hollow fibers prepared in accordance with the present method are typically below about one millimeter, and can be as low as 300 microns.

The minimum speed at which an article must be drawn through the coagulating bath to retain a continuous inner cavity and the maximum drawing speed that will avoid breakage is determined by a number of variables, including the molecular weight of the PVA, the viscosity of the polymer solution that is extruded into the coagulating bath, the temperature of the coagulating bath, and the viscosity and pressure of the non-solvent used to form the internal cavity of the article.

After emerging from the coagulating bath the shaped article in the form of a continuous hollow tube filled with the non-solvent that was coextruded together with the polyvinyl alcohol solution is placed in a bath of an alcohol or water to extract the dimethyl sulfoxide used to prepare the initial polymer solution. Any alcohol present in the extraction bath preferably contains from 1 to 4 carbon atoms. When water is present in this extraction bath the final material is a hydrogel.

The non-solvent that was coextruded with the polyvinyl alcohol solution during preparation of the tubing and occupies the central cavity of the tubins is conveniently removed during or following treatment of the tubing in the extraction bath by cutting the tubing and allowing the liquid in the central cavity to drain out. This process can be accelerated by pressurizing the cavity.

When it is desired to prepare small diameter hollow fibers the tubing collected from the extraction bath is first dried and then drawn to achieve the desired diameter. The tubing can be dried using any of the methods described in the prior art. The time required for drying can be shortened using heat alone or in combination with reduced pressure to accelerate evaporation of the solvent(s).

The dried tubing is drawn using a draw ratio that will achieve the desired diameter fiber and/or orientation of the crystalline structure of the polymer. This orientation appears to be a requirement for optimization of physical properties.

The fibers are preferably drawn in a liquid medium that is a no-solvent for the polymer and which is heated to temperatures of from 80° to about 230° C. This temperature range is preferably from about 140° to about 210° C. Liquid polydiorganosiloxanes, typically polydimethylsiloxanes and polyphenylmethylsiloxanes, also referred to as silicone oils, are preferred liquid media due to their thermal stability and chemical inertness with respect to polyvinyl alcohol.

Irrespective of the medium in which the fiber is drawn, drawing is most readily accomplished using a fiber take-up roll that rotates at a higher surface speed relative to the supply roll. The path traveled by the fiber between these two rolls takes it through the draw bath or other drawing medium.

Utility of the Present Extruded Articles

The hollow tubing and fibers of this invention exhibit all the desirable characteristics of non-crosslinked PVA hydrogels in addition to high levels of mechanical properties such as tensile and bursting strength. This combination of properties make the present article particularly desirable as semi-permeable membranes for a variety of processes, including but not limited to dialysis, reverse osmosis, ultrafiltration, gas separation and separation of liquid mixtures. The high water content, typically from 10 to about 90 weight percent, together with the non-toxic nature, biocompatibility and anti-thrombotic properties of PVA hydrogels make the present articles uniquely suited for use in medical devices such as catheters and delivery tubes for gas and liquids, artificial blood vessels and as the outer covering for wires and other articles intended for surgical implantation in the body.

When the present articles are used as catheters the initial water content of the hydrogel can be less than about 40 weight percent, making the device relatively rigid and facilitating insertion into body passages. When in contact with body fluids the tubing swells and becomes more flexible and resistant to blood clotting.

The following examples are intended to describe preferred embodiments of the present invention and should not be interpreted as limiting the scope of the invention defined in the accompanying claims. Unless otherwise indicated all parts and percentages specified in the examples are by weight and viscosities were measured at 25 degrees C.

EXAMPLE 1

This example describes one embodiment of the present method for preparing PVA tubing and the effect of extrusion conditions on the dimensions and physical properties of the final article.

A 15 weight percent solution of a polyvinyl alcohol exhibiting a number average molecular weight of 89,000 was prepared by adding the required amount of the polymer to 4:1 weight ratio mixture of dimethyl sulfoxide and water and heating the resultant mixture at 100° C. for about 30 minutes with stirring, at which time the polymer was completely dissolved. This solution was maintained at a temperature of 80° C. while being extruded under a number of predetermined pressures listed in the following Table 1 through the annular passage of a die assembly consisting of a substantially circular inner passage exhibiting a diameter of 3.7 mm. surrounded by a concentric annular outer passage exhibiting an inside diameter of 5.9 mm. and an outside diameter of 10 mm. A liquid polydimethylsiloxane exhibiting a viscosity of 0.1 Pa.s and maintained at a temperature of 20° C. was allowed to flow under its own weight through the inner passage from a reservoir concurrently with extrusion of the polyvinyl alcohol solution.

The outlet orifice of the die assembly was located from 1to 2 cm. above a coagulation bath consisting essentially of a mixture of methanol and dry ice having an equilibrium temperature of −75° C. The distance traveled by the extruded article while immersed in the coagulation bath was 244 cm. The extruded article was pulled through the coagulation bath using a 8.4 cm. diameter take-up spool rotating at a speed of from 8 to 66 rpm. The effect of the speed of this spool on the inner and outer diameters of tubing extruded using a pressure of 76 kilopascals on the PVA solution is demonstrated by the data in Table 2.

From the take-up spool of the extruded article was passed into a bath of methanol to extract the dimethyl sulfoxide and water. The tubing remained in the methanol bath for 16 hours, at which time a portion of the tubing was transferred to a container of water in which it remained for 16 hours to form a hydrogel.

Following removal from the methanol bath a second portion of the tubing was allowed to dry for 24 hours under ambient conditions. The dried tubing was then passed through a 5 cm.-long zone of air heated to a temperature of 145° C. and would on a take-up spool. The ratio of the surface speeds of the take-up and supply spools was 6:1. The outside diameter of the final fiber was 300 micrometers.

The tensile strength of the fiber was 90,000 p.s.i. (630 MPa) and the elongation at break was 20%.

The surface speed of the coagulation bath take-up spool used to obtain the data in Table 1 was 12.3 meters per minute.

TABLE 1

| Effect of Extrusion Pressure of PVA Solution on Tubing Diameter | | | | | |
|---|---|---|---|---|---|
| Pressure (kPa) | 69 | 104 | 138 | 173 | 207 |
| Outside Diameter (mm) | 1.98 | 2.98 | 3.45 | 3.85 | 3.95 |
| Inside Diameter (mm) | 0.5 | 0.5 | 0.5 | 0.5 | 0.5 |

TABLE 2

| Effect of Take-Up Spool Speed On Tubing Diameter | | | | | |
|---|---|---|---|---|---|
| Speed (rpm) | 8 | 16.4 | 25 | 38 | 66 |
| Outside Diameter (mm) | 4.9 | 3.8 | 3.2 | 2.6 | 2.2 |
| Inside Diameter (mm) | 1.1 | 1.0 | 0.8 | 0.6 | 0.4 |

Extrusion Pressure Applied To PVA Solution Was 76 kPa.

That which is claimed is:

1. A method for preparing an elongate article having a substantially circular outer contour, a hollow central core and consisting essentially of a non-crosslinked polyvinyl alcohol hydrogel, said method comprising the sequential steps of
   1) preparing a 2 to 30 weight percent solution of polyvinyl alcohol in a liquid mixture consisting essentially of dimethyl sulfoxide and from 10 to about 30 percent, based on the weight of said mixture, of a liquid that is miscible with dimethyl sulfoxide and is selected from the group consisting of water and alcohols containing from 1 to about 4 carbon atoms, where the number average molecular weight of said polyvinyl alcohol is at least 44,000;
   2) extruding the resultant polyvinyl alcohol solution in the form of said article into a coagulation bath concurrently with extrusion of a liquid polydiorganosiloxane, where said coagulation bath consists essentially of a second non-solvent of said polyvinyl alcohol, said coagulating bath is maintained at a temperature no higher than −10° C., said solution and said first non-solvent are extruded into said coagulation bath through a die having a perimeter, an outer orifice and a hollow mandrel having inner and outer surfaces and positioned within said die to provide an elongated article having a hollow central core of substantially constant configuration; the outer orifice defining the outer contour of said article and the outer surface of the mandrel defining the central core of said article, the hollow mandrel having a first passage therethrough culminating in an inner orifice which is in communication with the hollow central core of the extruded article, and where said PVA solution is extruded through a second passage defined by the perimeter of the die and the outer surface of the mandrel concurrently with extrusion of said first non-solvent through said first passage at a rate sufficient to maintain the configuration of said central core during coagulation of said article; and 3) removing said article from said coagulation bath and displacing at least the dimethyl sulfoxide portion of said liquid mixture retained in said article with water or a liquid alcohol containing from 1 to 4 carbon atoms.

2. A method according to claim 1 where said polyvinyl alcohol solution is maintained at a temperature of from ambient to 90° C. during the extrusion of said solution, said liquid mixture consists essentially of dimethyl sulfoxide and water, the hollow mandrel and the perimeter of said die have a substantially cylindrical contour, and the temperature of said coagulating bath is less than −50° C.

3. A method according to claim 2 where the temperature of said polyvinyl alcohol solution is maintained at a temperature of from 60° to 90° C. during the extrusion of said solution and the said solution contains at least 10 weight percent of polyvinyl alcohol.

4. A method according to claim 1 where following displacement of the dimethyl sulfoxide said article is dried and then drawn in a heated liquid or gaseous medium to achieve an outer diameter less than 300 microns.

* * * * *